United States Patent [19]

Severs et al.

[11] 4,302,291

[45] Nov. 24, 1981

[54] UNDERWATER NUCLEAR POWER PLANT STRUCTURE

[76] Inventors: Stephen B. Severs, 3454 Castle Glen Dr., Apt. 216, San Diego, Calif. 92123; Harry V. Toll, 7 Dewart Rd., Greenwich, Conn. 06830

[21] Appl. No.: 35,709

[22] Filed: May 3, 1979

[51] Int. Cl.³ .................. G21C 19/20; G21C 19/32; E02D 22/24; E02D 29/00
[52] U.S. Cl. .................. 376/293; 405/195; 405/210; 376/317; 376/912
[58] Field of Search .................. 176/37–38, 176/87, DIG. 3, 39; 114/256, 257, 264; 405/208, 210, 195

[56] References Cited

U.S. PATENT DOCUMENTS

| | | | |
|---|---|---|---|
| 3,087,883 | 4/1963 | Haftke | 176/87 |
| 3,115,450 | 12/1963 | Schanz | 176/87 |
| 3,118,818 | 1/1964 | Bray | 176/DIG. 3 |
| 3,159,130 | 12/1964 | Vos | 405/210 |
| 3,375,162 | 3/1968 | Wilson | 176/37 |
| 3,486,343 | 12/1969 | Gibson | 405/208 |
| 3,717,001 | 2/1973 | Tam | 405/210 |
| 3,794,849 | 2/1974 | Perry | 405/195 |
| 3,986,367 | 10/1976 | Kalpins | 176/87 |
| 4,004,429 | 1/1977 | Mouton | 405/195 |
| 4,109,478 | 8/1978 | Gracia | 405/195 |
| 4,114,393 | 9/1978 | Engle | 405/210 |
| 4,117,691 | 10/1978 | Spray | 114/264 |
| 4,123,323 | 10/1978 | Weber | 176/38 |

OTHER PUBLICATIONS

[CRBRP]–Proposed Reference Design for the Clinch River Breeder Reactor Plant, PMC-74-01, Conf.-741087, pp. 42–47.

*Primary Examiner*—David H. Brown
*Assistant Examiner*—Edward F. Miles
*Attorney, Agent, or Firm*—Richard H. Zaitlen

[57] ABSTRACT

A structure for an underwater nuclear power generating plant comprising a triangular platform formed of tubular leg and truss members upon which are attached one or more large spherical pressure vessels and one or more small cylindrical auxiliary pressure vessels.

12 Claims, 8 Drawing Figures

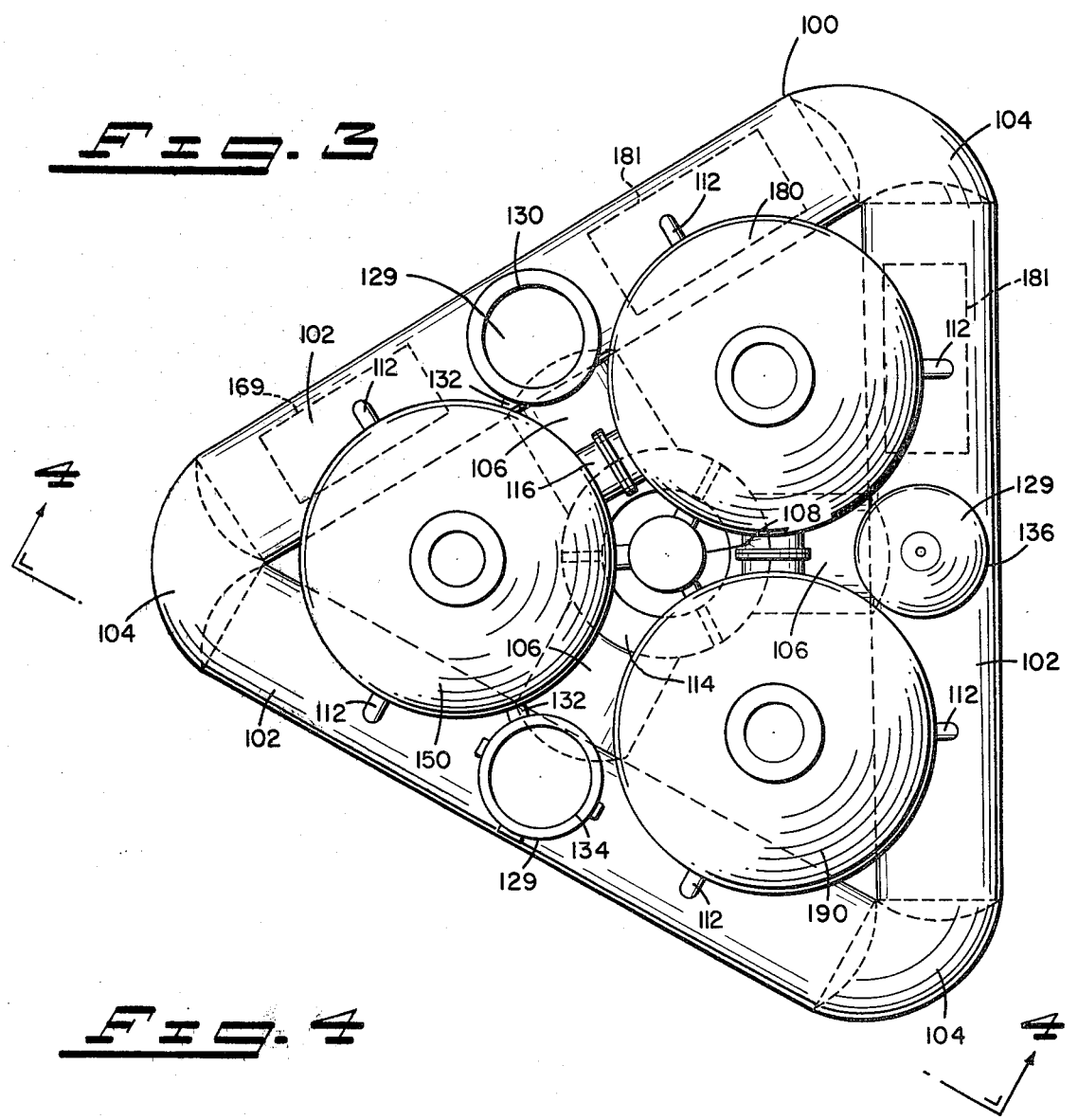
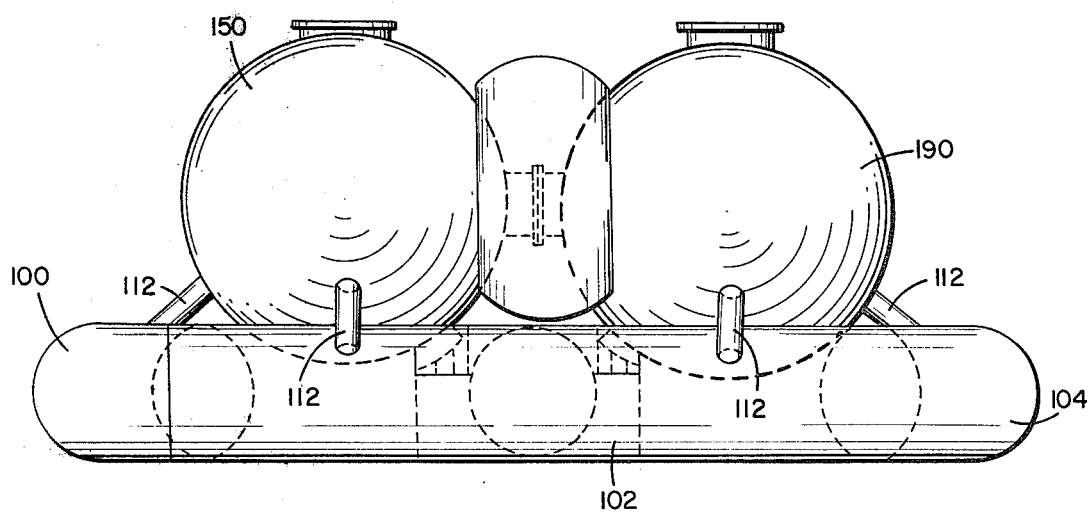

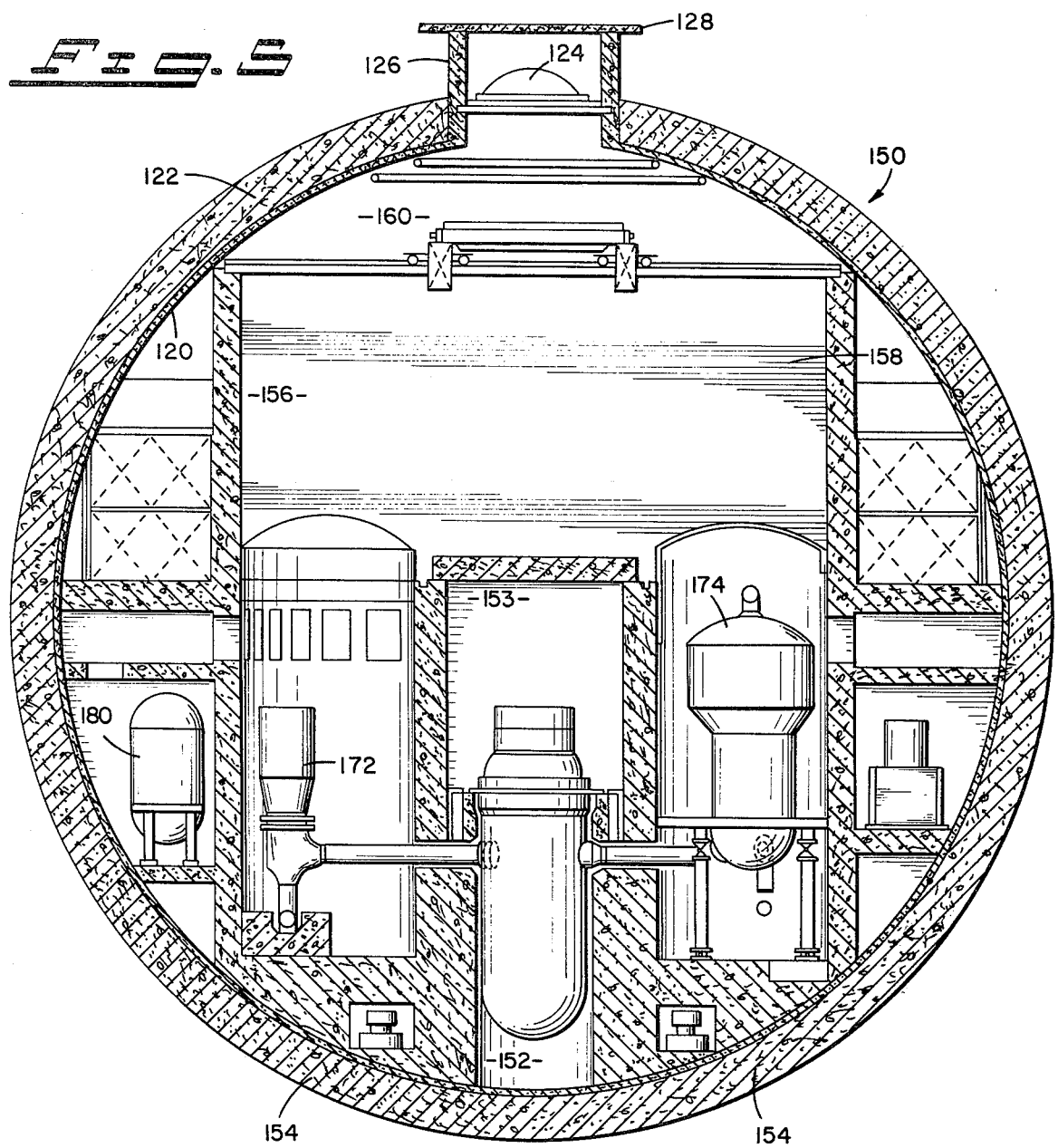

UNDERWATER NUCLEAR POWER PLANT STRUCTURE

BACKGROUND OF THE INVENTION

1. Field of the Invention

This invention relates to nuclear power generating plant structures, and more particularly, to a totally submersible platform and containment system for a nuclear power generating plant.

2. Description of the Prior Art

Large nuclear power generating plants are currently sited on land near a water supply necessary for use in evaporative cooling of their associated steam condensers. Competitive land and water uses are making it extremely difficult to procure new land sites for nuclear generating plants and their transmission systems. The unique features of each land site also make it difficult to introduce standardization and "mass" production methods into nuclear power plant design so as to benefit from assembly line production techniques. Particular difficulties with land-sited nuclear power generating plants are:

1. engineering and social conflicts due to the safety and aesthetic characteristics of nuclear power generating plants;
2. the environmental impact of nuclear power generating plants on the water resources in their locale due to their need to reject heat; and
3. the need for isolation of nuclear power generating plants from potential ground motions resulting from seismic events in the vicinity of the plant location.

One possible solution to these difficulties can be effected by placing the plant underground. Several recent studies of this type of siting have indicated that the cost penalties involved do not warrant the potential benefits. The studies also suggest a requirement for necessary geological siting criteria which may not exist in many locations. Also, underground siting does not provide in itself for seismic isolation.

Another possible solution to land siting of nuclear power generating plants, particularly for situations where electrical energy use centers are located near the ocean, is the employment of offshore surface mooring of a floating nuclear power plant, such as is incidentially shown in PERRY, et al. (U.S. Pat. No. 3,794,849). However, obvious major problems arise in such a design from meteorological, surface, and artificial causes.

An attractive alternative to either land siting or offshore surface mooring of a nuclear power plant is the employment of an underwater mooring site. Such a location would protect the plant from adverse meteorological and surface conditions, as well as provide greater isolation from potential ground motions due to seismic activity. Further, undersea siting of nuclear power plants would minimize the danger of theft or sabotage of nuclear materials, since special equipment is required in order to gain access to the submerged plant. Further still, such siting offers several engineering advantages over alternative methods. For example, all nuclear reactors of the water-cooled steam generator type require vast amounts of water to cool their associated steam condensers. For higher efficiency in generating electrical power, this cooling water should have as low a temperature as possible. Further, discharged cooling water should be remixed with its source as quickly and efficiently as possible in order to reduce any impact on the environment due to thermal pollution.

Undersea siting of a nuclear power plant simply and easily meets the above criteria: the supply of cooling water is virtually unlimited, the water temperature at a depth of a few hundred feet is significantly lower than the surface temperature, and efficient remixing of effluent cooling water is readily achieved by convection currents.

A further engineering advantage of undersea siting over alternate methods is the presence thereby of a virtually unlimited heat sink for the reactor in the event of a loss-of-coolant accident, thus preventing dangerous overheating of the reactor core.

SCHANZ, (U.S. Pat. No. 3,115,450) discloses a nuclear reactor situated within a small spherical containment pressure vessel for siting on land, but this embodiment, unlike the present invention, is not believed to be designed to withstand the very large external pressures present at even a few hundred feet beneath a body of water.

BRAY, (U.S. Pat. No. 3,118,818) also shows a submersible nuclear thermoelectric power plant for use in low power (approximately 50 kilowatts) situations, but this design is not believed to be feasibly expandible to the size (approximately 3400 megawatts) necessary to provide sufficient power to offset the cost of construction of such a plant.

It should be appreciated that while spherical pressure vessels for nuclear reactors are described in the prior art, as in HAFTKE, (U.S. Pat. No. 3,087,883), and also that underwater pressure spheres are well known, as in MOUTON, JR., (U.S. Pat. No. 4,004,429), the prior art does not show the combination of elements of the present invention, as more fully discussed herein. In the present invention, the spheres used must not only be able to withstand the large external pressure of the surrounding body of water, but also the internal steam pressure that might occur in the event of a loss-of-coolant nuclear accident.

A loss-of-coolant nuclear accident may occur when a failure happens somewhere in one or more of the coolant loops of a nuclear reactor. In such a situation, the water normally in and around the reactor is vaporized by the heat generated by the reactor, thereby increasing the internal pressure of the enclosing containment sphere tremendously.

It should be further appreciated that although submersible sea platforms of various types are shown in the art, as in GIBSON, et al. (U.S. Pat. No. 3,486,343) and British Patent No. 963,083, the present invention shows a configuration of spherical pressure vessels housing a nuclear steam power generating plant mounted on a platform for total submergence which is unique. The structure of the present invention is particularly rigid, strong, and stable, and the preferred embodiment provides for direct access from any one pressure sphere to the adjacent spheres.

It is therefore an object of this invention to provide a safe and convenient means to house a nuclear power generating plant beneath a body of water.

A further objective is to isolate a nuclear power generating plant from potential ground motion resulting from seismic events in the vicinity.

Another object is to increase the thermal efficiency of such a plant by submerging the plant at depths having a significantly colder temperature than does the surface.

Still a further object of this invention is to provide for more efficient dissipation of the heat rejected from the plant's condensers, due to convection mixing of the effluent waters with the surrounding body of water.

Yet another object is to reduce the demands on limited water supplies which a land-sited plant requires.

The novel features which are believed to be characteristic of the invention, both as to its organization and method of operation, together with further objectives and advantages thereof, will be better understood from the following description considered in connection with the accompanying drawings in which the presently preferred embodiment of the invention is illustrated by way of example. It is to be expressly understood, however, that the drawings are for the purpose of illustration and description only, and are not intended as a definition of the limit of the invention.

SUMMARY OF THE INVENTION

The invention in its preferred embodiment comprises a triangular platform structure formed of three tubular platform members, or legs. To the midpoint of each leg is connected a tubular truss member which converges to the vertical axis of the platform, the truss member there being attached to a perpendicular axial tubular member, or kingpost. Each leg is strengthened by circumferential stiffening rings, and is provided with bulkhead-equipped compartments, thus permitting access to sections of a leg. Other portions of each leg are used as independent flotation, ballast, or auxiliary storage tanks. The three legs are joined together at the apexes of the platform triangle by ferroconcrete fittings, or elbows, which house jacking gear and pile support sleeves if a pile foundation is used to anchor the platform as hereinbelow described.

Placed upon the three quadrilateral areas formed by the trussed triangular platform are three large interconnected spherical pressure vessels, each having an internal diameter of about 150 feet. The nested inner shell of each sphere is of 2 inch thick welded carbon steel, with strengthening ribs and stiffening rings providing additional structural support. The surrounding outer spheres are of 6.5 feet thick ferroconcrete. Each sphere is equipped with a top polar cap piercing the sphere and fitted with a transfer trunk, pressurized hatch, and a mating flange for connection to underwater service vessels. The spheres are constructed to withstand water pressure to a depth of 1500 feet with a safety factor of 2.5 at the maximum permitted depth.

A first one of the pressure spheres houses a pressurized water nuclear reactor and its associated nuclear steam system, a nuclear refueling system, and a containment system. The containment system is comprised of a set of sub-systems designed to control and encompass the nuclear reactor and its by-products in the event of a nuclear mishap. This first sphere is specially reinforced and designed to withstand and contain the contents of the coolant system of a nuclear reactor if a loss of coolant accident occurs.

A second of the spheres houses a steam turbine-generator unit, a reactor feed water purity control system, and reprocessing facilities for chemical reactor control additives. The steam turbine-generator unit derives its motivating power from the nuclear steam system housed in the first sphere. Associated with this second sphere are twin steam condenser units housed in the two platform legs upon which the second sphere rests.

A third sphere contains the control and operating system for the entire plant, personnel living facilities, life support systems, emergency storage batteries, power transformers, workshops and auxilliary support systems necessary for normal and emergency plant operations. The life support system includes sub-systems for oxygen generation, carbon-dioxide elimination, atmosphere contaminant removal, waste disposal, food and water supplies, and heating, cooling, and ventilation.

The three pressure spheres housing the various components of the nuclear power generating plant are interconnected with each other by means of bulk-headed pressure locks. The spheres also have bulk-headed pressure access hatches to the two platform legs upon which each rests.

Also attached to the triangular platform are three secondary pressure vessels, cylindrical in shape. Affixed between the reactor sphere and the generating sphere is a double compartmented tank, the top half containing concentrated boric acid solution used for chemical reactor control, the bottom half holding emergency core cooling water. Another tank containing high purity make-up feed water for the reactor is situated between the reactor sphere and the support sphere.

The remaining secondary pressure vessel is a fully sealable personnel airlock/decompression chamber affixed between the support sphere and the generating sphere. Used primarily for transferring personnel and supplies, this chamber can also serve as an emergency escape unit in the event of a major catastrophe.

The entire platform is attached to the bottom of a body of water either by foundation piles or a cable mooring system in combination with dynamic positioning and stabilization of the platform itself.

By the use of the structure of the present invention, problems with prior art designs are substantially overcome.

BRIEF DESCRIPTION OF THE DRAWINGS

FIG. 3 displays a top plan view of the present invention.

FIG. 4 is an elevational view along line 4—4 of the structure shown in FIG. 3.

FIG. 5 shows an elevation cross-sectional view of the reactor sphere of the present invention.

DETAILED DESCRIPTION

Figure 1:
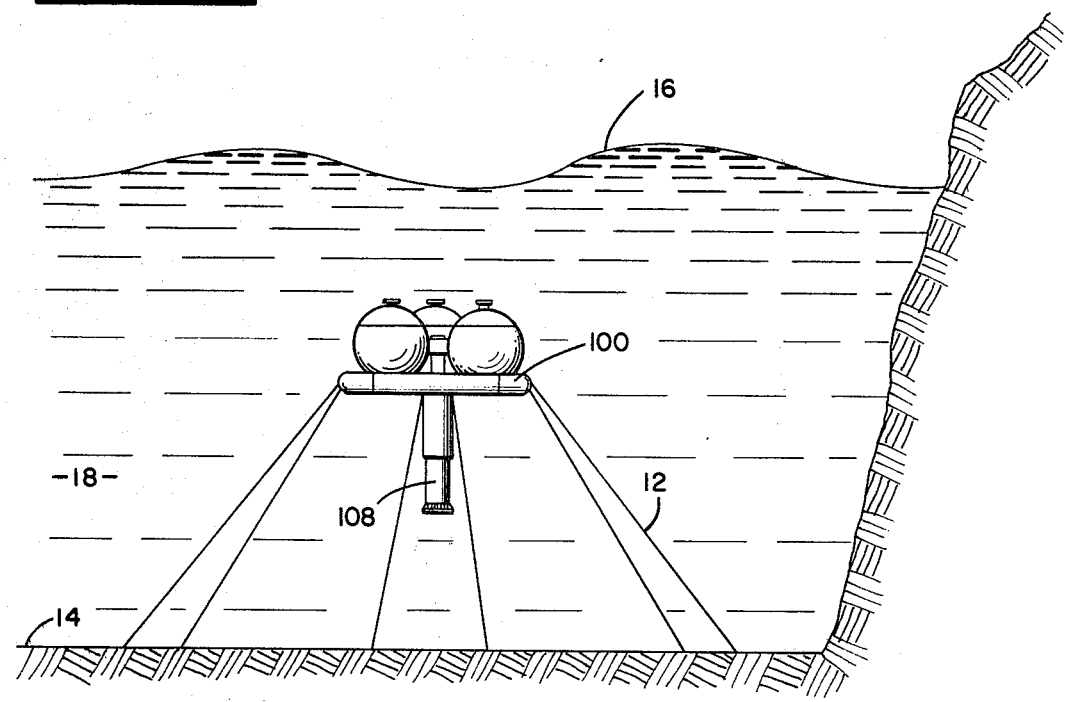
FIG. 1 shows a perspective view of the present invention moored underwater.

Referring to FIG. 1, there is illustrated the present invention. More specifically, an underwater nuclear power plant structure 10 is moored by means of flexible cables 12 to an underwater plateau 14 several hundred feet beneath the surface 16. Such flexible mooring ties 12 in combination with damping provided by the surrounding body of water 18 serve to isolate the invention from ground motion resulting from seismic events in the vicinity. In such a configuration, positioning of the platform may also be maintained through dynamic means, such as thrust vectors derived from the intake and output of condenser cooling waters in conjunction with sonar transponders for measuring positional changes. The dynamic positioning equipment would operate as a backup system in case the moorings are fouled or broken, or need to be repositioned or replaced. An alternative siting method might be a pile foundation. In this embodiment, horizontal stability of the platform is maintained by an automatic ballast and trim system utilizing two gyroscope reference platforms as a standard of comparison. Each leg of the platform is cross-connected with transfer piping enabling an automatic system of valves, pumps, and storage tanks to adjust and trim ballast and thus maintain the horizontal stability of the platform.

Figure 2:
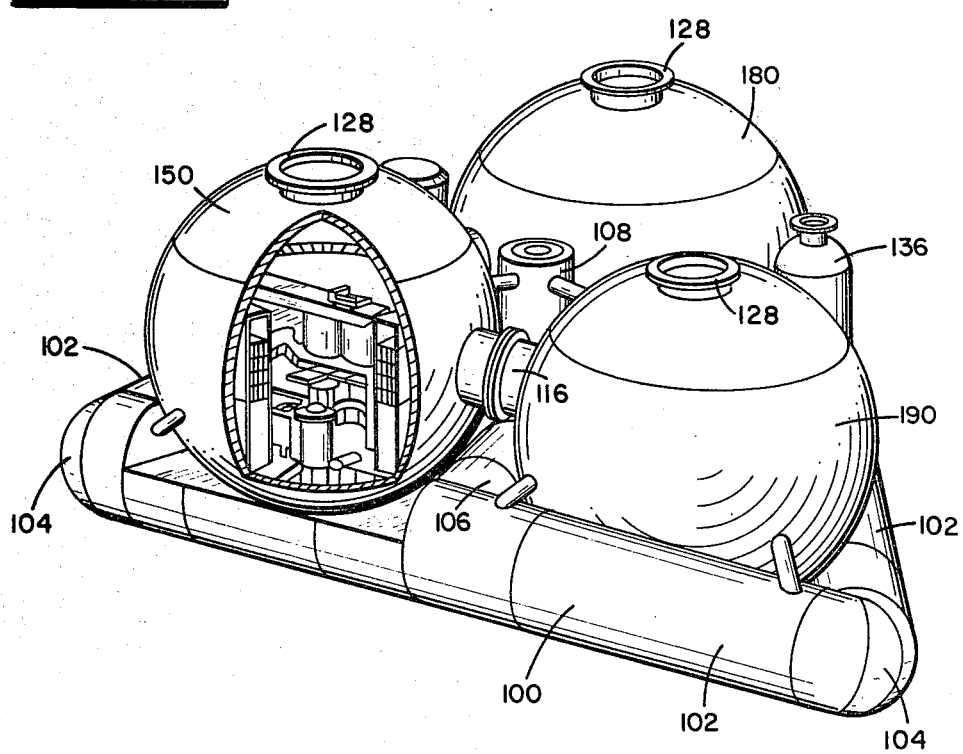
FIG. 2 provides a perspective view of the present invention, with the reactor sphere partially cutaway.

FIGS. 2-4 illustrate the present invention in greater detail. The platform 100 shown in FIG. 2 is composed of three tubular legs 102 joined at their ends so as to form an equilateral triangle, FIG. 3 best showing this shape. Each leg is internally sectioned off with rigid bulkheads to form watertight flotation or ballast tanks or as auxiliary equipment and storage spaces. Each leg 102 has at least one external access hatch and airlock to the open water. The legs are strengthened by the bulkheads and further supported by circumferential stiffening rings. The legs are joined at their ends by ferroconcrete elbows 104, as shown in FIG. 3. If a pile foundation is used in siting the platform, these elbows 104 would house pile support sleeves and jacking gear. Ferroconcrete is utilized because of its great strength, easy moldability, and resistance to salt water corrosion. Other materials are also within the scope of this invention.

Attached to the midpoint of each leg of the platform is a tubular truss member 106 which converges and is connected to a perpendicular axial tubular member, or kingpost 108. This kingpost 108 may extend a distance beneath the triangular platform 100 as shown in FIG. 1 and may be heavily ballasted, so as to improve the horizontal stability of the triangular platform 100. The truss members 106 are pressurized and equipped with bulkheads so as to allow for inter-leg access.

Referring again to FIG. 3, there is shown several primary and secondary pressure vessels attached to the top of the triangular platform 100 in its preferred embodiment. The primary pressure vessels are three spheres 150, 180 and 190 which house the equipment necessary to an underwater nuclear power generating plant. Each sphere rests upon one of the three quadrilateral areas of the platform formed by the legs 102 and truss members 106, thereby maintaining an even weight and structural load distribution on the platform 100. Each sphere is connected to the two legs upon which it rests by tubular bulkhead-equipped access members 112, and is also similarly connected to a support ring 114 of the axial kingpost 108. Large-diameter bulkhead-equipped transfer tubes 116 interconnect the three spheres 150, 180 and 190, allowing for passage of personnel and material between spheres.

As illustrated in FIG. 5, each of the pressure spheres have an internal diameter of approximately 150 feet and are constructed of two concentric shells. The inner shells 120 are of 2 inch thick welded carbon steel, with strengthening ribs and rings providing further support. The surrounding outer shells 112 are approximately 6.5 feet thick and formed of ferroconcrete. Ferroconcrete is used because it is easy to form, provides great structural strength, and is highly resistant to salt water corrosion. Each sphere is equipped with a top polar pressurized hatch 124, leading to a transfer trunk 126 and mating flange 128 for connection to underwater service vessels. It should be understood that other configurations for spheres 150, 180 and 190 are also within the scope of this invention.

All of the hatches, hull penetrations, and transfer trunks of each sphere are pressure sealed to maintain watertight integrity. The pressure spheres themselves are designed to have a safety factor of 2.5 at the maximum permitted depth of 1500 feet. All structural steel used in the pressure vessels will be connected by welding and be similar in design to a conventional nuclear power plant. Bolted joints are used in special circumstances such as in mating tunnels.

The three secondary pressure vessels 129 attached to the triangular platform 100 illustrated in FIGS. 3-4 are cylindrical in shape. Each is affixed between two of the spheres 150, 180 and 190 and atop a platform leg 102. One of the secondary vessels is a chemical tank 130 situated on one of the platform legs 102 supporting the reactor sphere 150, and is compartmentalized into halves, the top half containing concentrated boric acid solution for chemical reactor control and the bottom half holding emergency core cooling water. This chemical tank is connected to the reactor sphere 150 by a transfer tube 132.

A similar tank is tank 134 which contains high purity makeup feed water for the reactor in a single compartment. It is situated on the other leg 102 supporting the reactor sphere 150, and is simiarly connected by a transfer tube 132 to the reactor sphere 150.

The remaining secondary pressure vessel, a fully sealable personnel airlock/decompression chamber 136, is affixed on the platform leg furthest from the reactor sphere 150. This chamber 136 serves primarily for tranferring personnel and supplies to the plant from submersible service vessels. In the event of a major catastrophe, the chamber 136 can be detached from its connection to the platform by means of explosive bolts and thence make a free ascent to the surface for rescue.

A first one of the pressure spheres serves to house a pressurized water nuclear reactor, a nuclear steam system, a nuclear fuel handling system, and a containment system. This reactor sphere is shown here as sphere 150 in FIG. 3. The reactor and steam system may be a commercially available integrated unit such as a Westinghouse Nuclear Steam Supply System, which consists of a pressurized water reactor rated at approximately 3,425 Mw(t), a four-loop reactor coolant system, and associated support systems. Other systems are also within the scope of this invention.

Figure 6:
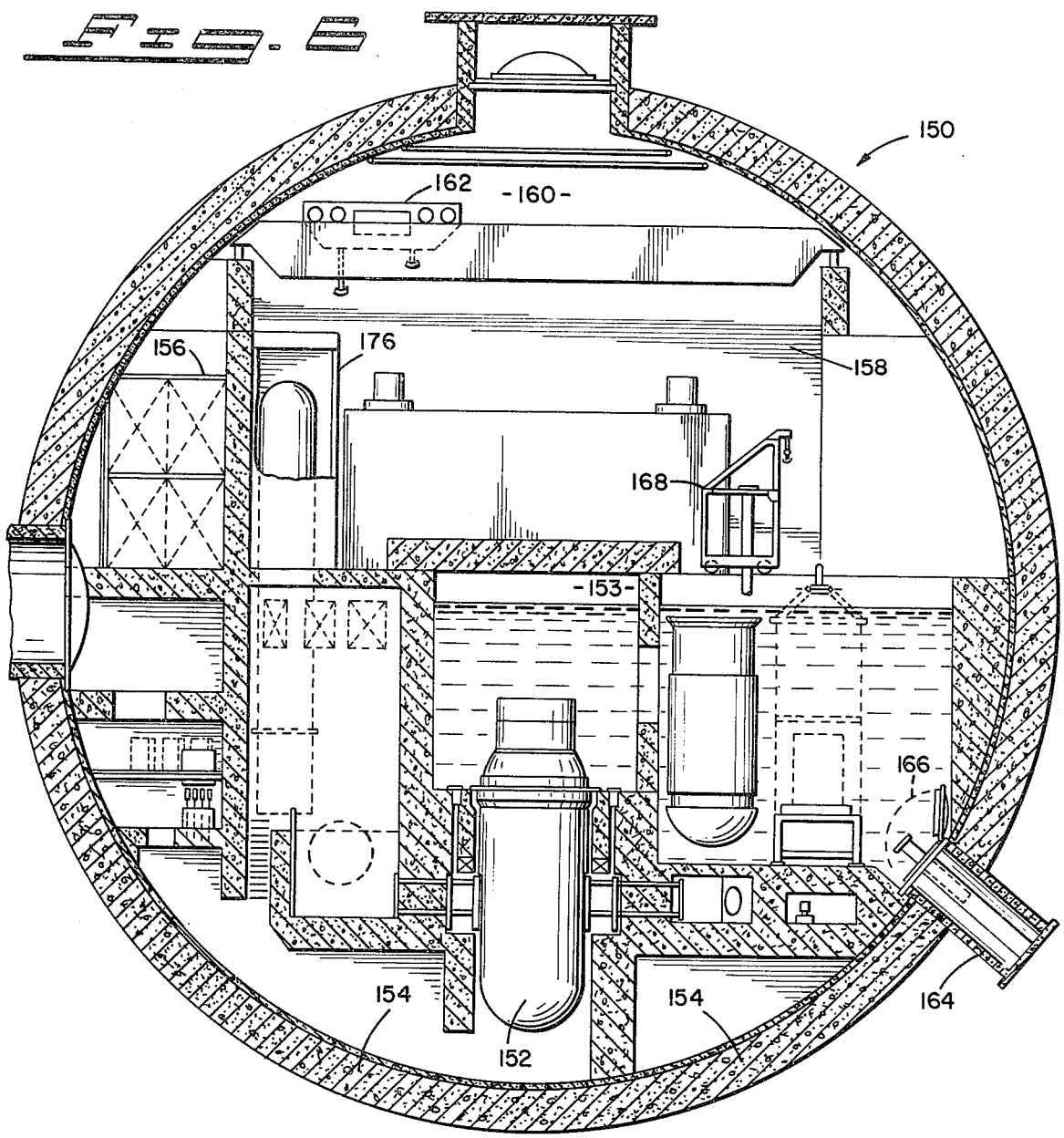
FIG. 6 provides an elevation cross-sectional view of the reactor sphere of the present invention, at 90-degrees to the view shown in FIG. 5.
Figure 7:
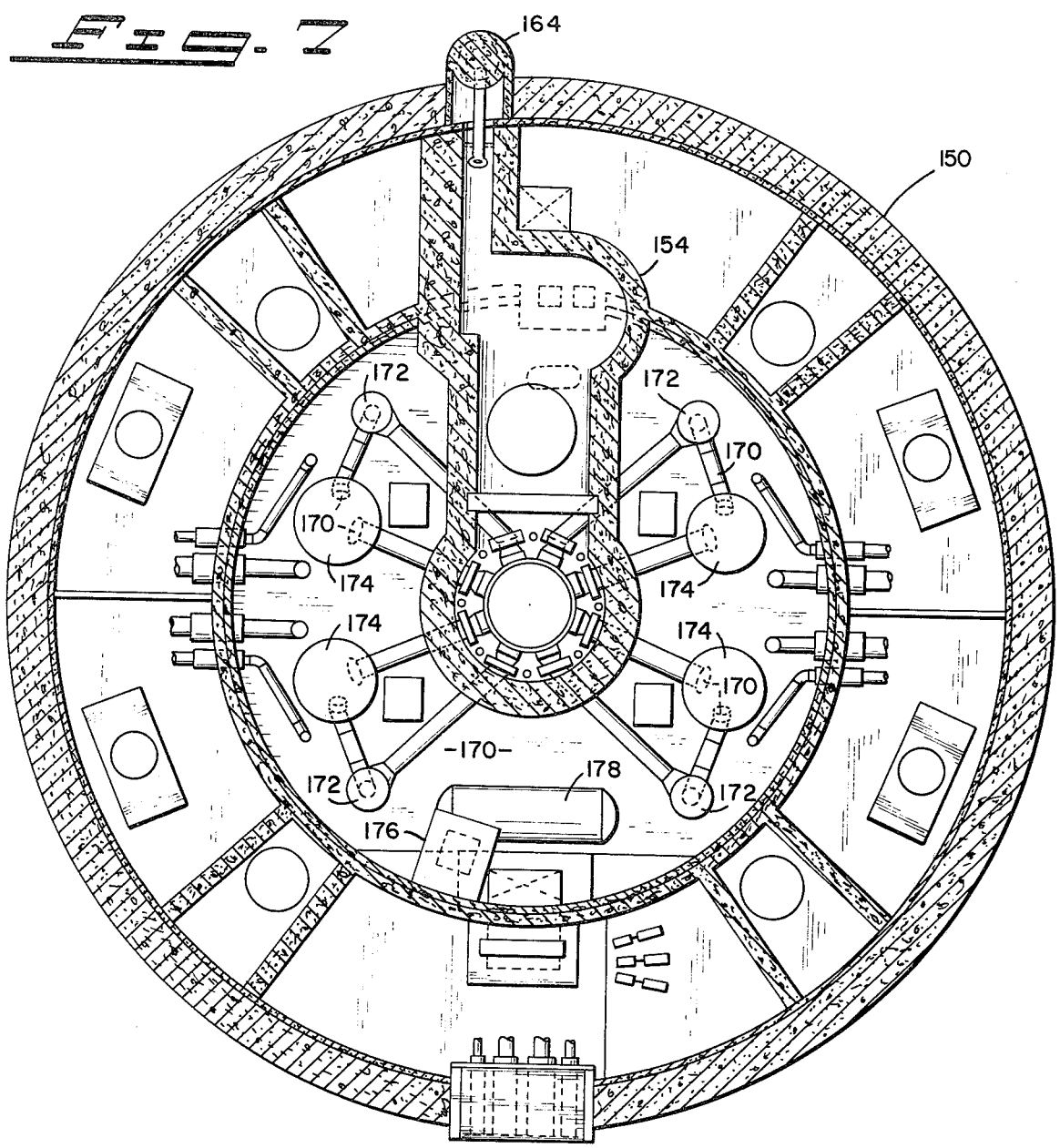
FIG. 7 provides a cross-sectional view from the bottom pole of the reactor sphere of the present invention.
Figure 8:
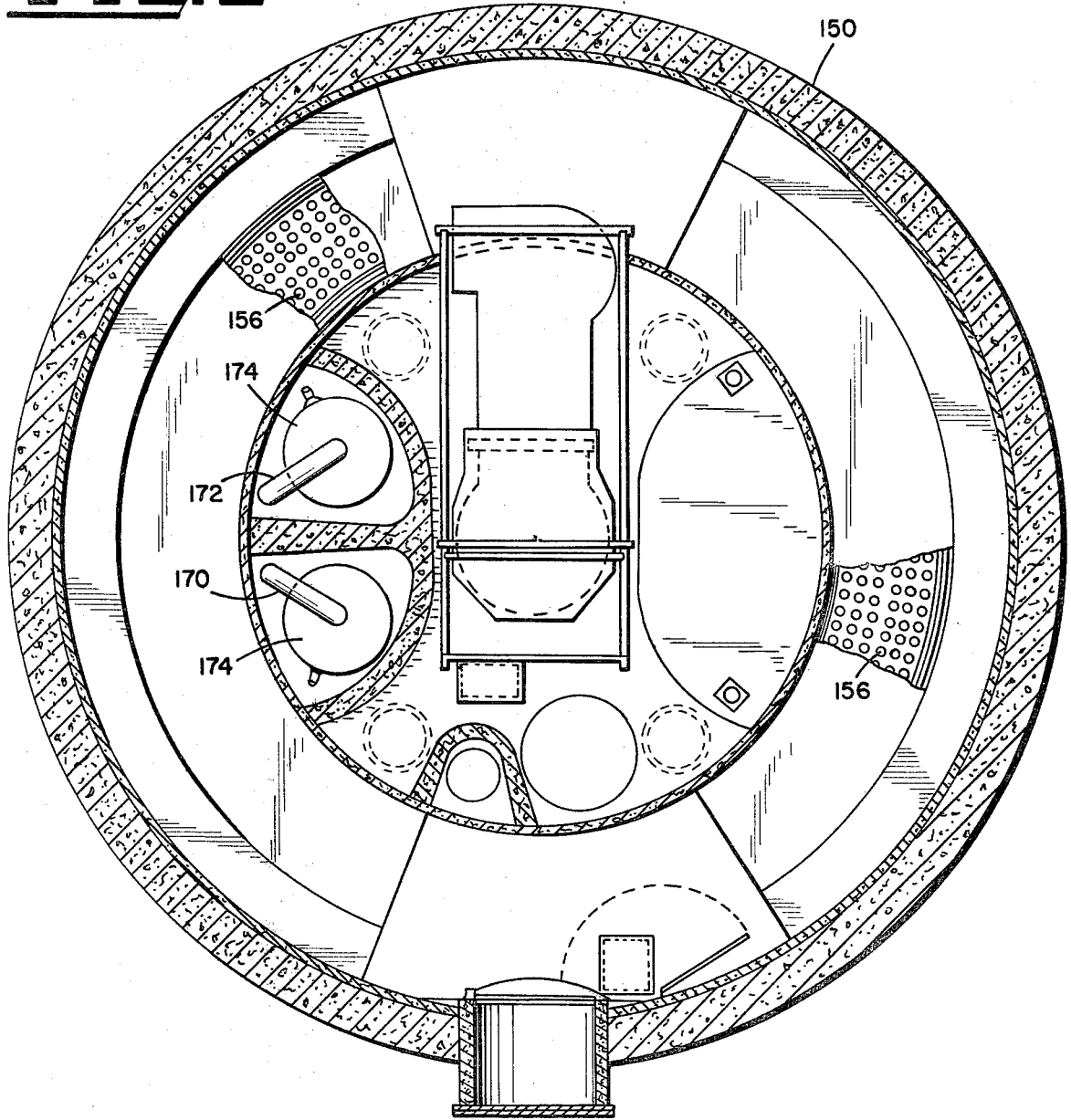
FIG. 8 discloses a cross-sectional plan view of the reactor sphere of the present invention.

FIGS. 5-6 illustrate the layout of the reactor sphere 150. The reactor vessel 152 is submerged beneath a pool of borated water 153 along the axis and near the bottom of the reactor sphere 150 in a ferroconcrete containment structure 154. The pool of water is borated to act as a nuclear reactivity control mechanism. Above the reactor vessel 152, at the 115 foot level, is an ice condenser containment system 156 in the upper compartment 158 of the reactor sphere 150. This system consists of an insulated and refrigerated grouping of ice-filled receptacles located behind lightly spring-loaded doors. In the event of a loss-of-coolant accident or steamline break, the resulting increase in steam pressure forces the doors open and allows the escaping steam to rise through the ice baskets, thus condensing the steam and insuring that the reactor sphere 150 internal pressure limit is not exceeded.

In addition to the ice condenser containment system, a water spray containment system 160 is mounted above the reactor vessel 152 to assist in condensing steam if an accident occurs. The spray containment system 160 has an additional advantage in its ability to remove radioactive particulates from the atmosphere of sphere 150.

Also above the reactor vessel 152 is a polar crane 162 spanning the top of the reactor sphere 150, for use during refueling and maintenance of the reactor vessel 152 and its associated systems.

Near to the reactor vessel 152, as illustrated in FIG. 6, is a fuel transfer system 164. New fuel is delivered by diving bells or submersible service vessels to a fuel-receiving compartment in one of the platform legs adjacent to the reactor sphere 150. From there, the fuel is placed in the fuel transfer system 164 which carries the fuel through a pressurized transfer trunk 166 into the reactor sphere 150. Thereafter, the fuel is placed into the core of the reactor vessel 152 by an overhead fuel manipulator crane 168. Spent fuel is handled by a reverse process, except that it is held in a large flooded compartment 169 in one of the platform legs for a suitable decay period before being transferred to the surface for reprocessing. Spent fuel is handled entirely under borated water from the time it leaves the reactor vessel until it is placed in a transfer cask for shipment to the surface. Such submerged handling provides an effective, economical, and transparent radiation shield for the spent fuel, as well as a reliable cooling medium for removal of decay heat.

The nuclear steam supply system shown in FIGS. 5–8 consists of a reactor vessel 152 and four closed reactor coolant loops 170 connected in parallel to the reactor vessel 152. Each reactor coolant loop 170 contains a reactor coolant pump 172, a steam generator 174, loop piping, and appropriate instrumentation. The nuclear steam supply system also contains an electrically heated pressurizer 176 and its associated pressurizer relief tank 178.

In operation, high pressure water (2500 psia) circulates through the core of the reactor vessel 152 to remove the heat generated by the nuclear chain reaction. The heated water (650 degrees F.) exits the core of the reactor vessel 152 and passes via the reactor coolant loops 170 to the steam generators 174. There the heated water gives up its thermal energy to feed water to generate steam for the turbine-generator located in a second sphere. The thermal cycle is completed when the reactor water is pumped back to the reactor vessel 152 by the reactor coolant pumps 172.

The reactor coolant pumps 172 are vertical, single stage mixed flow pumps of a shaft seal type. The power supply system to the reactor coolant pumps 172 is designed such that adequate coolant flow to the reactor vessel 152 is maintained to cool the reactor core under all credible circumstances. Emergency batteries located in another pressure sphere comprise a major component of the reactor coolant pump power supply.

The steam generators 174 are vertical U-tube units which contain, for example, Inconel tubes. Integral moisture separation equipment reduces the moisture content of the steam in the steam generators 174 to one quarter of one percent or less. The piping of the reactor coolant loops 170 and all the pressure-containing heat transfer surfaces in contact with reactor water are stainless steel clad, except for the tubes of the steam generators 174 which are of Inconel, and the cladding around the reactor fuel tubes which is of Zircaloy.

Pressure in the nuclear steam system is controlled by the pressurizer 176, which maintains system pressure through the use of electrical heaters and water sprays. Steam can either be formed by the electrical heaters or condensed by the water sprays to minimize pressure variations due to contraction and expansion of the coolant medium. Spring-loaded steam safety valves and power operated release valves for over pressure protection are connected to the pressurizer 176 and cause excess pressure to be discharged to the pressurizer relief tank 178, where the discharged steam is condensed and cooled by mixing with water.

The license application reactor power level of the present embodiment will be 3,423 thermal megawatts which will include 12 thermal megawatts from the reactor coolant pumps 172. Operation at the reactor core design rating of 3,411 thermal megawatts yields a steady state core average linear power of 5.44 kilowatts per foot and a corresponding peak power of 13.6 kilowatts per foot, which meets the acceptance criteria for emergency core cooling systems. Reactivity coefficients and other design parameters which are supported by analysis and experience with other plants provide the basis for concluding that the reactor used in the present embodiment could operate safely at the power levels of the application rating. The reactor will be designed to have a negative moderator temperature at all times throughout the core life.

The reactor core, with its related control and protection systems, will be designed to function throughout its designed lifetime without exceeding acceptable fuel damage limits. The core design together with process and residual heat removal systems, will provide for this capability under all expected conditions of normal operation with appropriate margins for uncertainties and anticipated transient situations, including, as examples, the effects of the loss of reactor coolant flow, turbine disengagement due to steam and power conversion system malfunctions, and loss of external electrical load.

The reactor core will be a three-region cycled core. Slightly enriched uranium dioxide clad in cold work Zircaloy tubes make up the fuel rods, in a canless type of fuel assembly. Absorber control rods are fabricated of silver-indium-cadnium sealed in stainless steel tubes. Fixed burnable poison rods are also employed, utilizing borosilicate glass sealed in stainless steel tubes. The rod drive mechanisms for the fuel and control rod assemblies are of the magnetic latch type. Three magnetic coils control the latches. These coils are so designed that upon upon loss of power to the coils, the control rod assembly is released and falls into the core by gravity to shut down the reactor. Part length control rod assemblies are also used to control the reactor. These assemblies are normally in the core at all times and are driven by a roller-nut type of mechanism which moves at slow speed and stops moving upon loss of power.

Auxiliary systems necessary to the nuclear steam system are also located within the reactor sphere 150 to perform such functions as adding make-up water to the reactor coolant system, purifying reactor coolant water, providing chemicals for corrosion inhibition and reactor control, cooling system components, removing decay heat when the reactor vessel 152 is shut down, and providing for emergency core cooling in the event of a loss-of-coolant accident. This last system automatically delivers a boric acid solution to the reactor vessel 152 core via the return leg of the reactor coolant loops 170 to cool the reactor vessel 152 under high and low reactor pressure conditions, and also to insert negative reactivity during plant cool down following a steam line rupture or any accidental steam release. In addition to this standard cold leg injection, the emergency core cooling system of the plant is provided with a special injection feature that will deliver additional borated water from a high pressure accumulator 180 to the core of the reactor vessel 152 via the upper structural portion of the reactor vessel 152.

Reactor instrumentation, both in core and external, is provided to monitor variable reactor operating levels of neutron flux, primary coolant pressure, temperature, chemistry, and rod control position. Values are displayed to an operator in a control facility and are input to a computer for use in automatic flux balancing, power level control, and for automatic safety trip systems. The number and types of instrumetation provided are adequate for safe operation of all systems and processes under normal full power, reduced power, and over-power accident conditions.

Reactor safety scram circuits include an over-power transient temperature rate trip, an over-temperature transient temperature rate trip, and a nuclear over-power trip. These primary shut-down trips are designed to prohibit any combination of power level, pressure, or temperature that would result in a departure from a nuclear boiling rate greater than 1.3. Additional reactor safety scram circuits react to abnormal pressure variations, loss of coolant flow, abnormal neutron flux rates, steam turbine malfunctions, and manual control. Redundant, independent circuits are provided in each case to assure proper operation.

A second of the pressure spheres serves to house the actual power generation plant. This generating sphere 180 contains all the primary and auxiliary turbines, generators, heat exchangers, pumps, storage tanks, and piping necessary for the conversion of heat energy generated by the nuclear reactor plant in the reactor sphere 150 into electrical power. Also located in the generating sphere 180 is a reactor feed-water purity control system and reprocessing facilities for chemical reactor control additives. Additional parts of the power generation plant are housed in the two adjacent platform legs 102 and in the lower half of the third sphere, the support sphere 200.

In operation of the reactor of the present invention, demoisturized, saturated steam is received by the power generation plant system from the four interconnected and pressure balanced steam generators 174 housed in the reactor sphere 150. See FIGS. 5–8. This high temperature, high pressure steam enters a high pressure turbine and then exhausts into six reheaters. There it is again demoisturized and sent through a two-stage super heater. From the reheaters and super heaters the steam expands through three low pressure turbines after which it is exhausted to the condensers 181 located in the two platform legs upon which the generating sphere 180 rests. The condensed steam is then deaerated, filtered, treated if necessary, preheated from contact with the condensers, and then either returned to the feed water inlet of the steam generators 174 or placed in make-up feed water storage tanks.

As a safety feature, an interlocked system of controls will scram the reactor 152 if any of the major components of the generating sphere 180 fail.

The high pressure turbine is a dual-flow-type (to eliminate thrust forces on the turbine and mounting centers) with a Rateau (impulse) first stage and reaction stages for the remainder of the turbine. Steam enters the turbine through two steam chests and two sets of throttle and governing valves, one set being in the upper half and one set in the lower half of the turbine case. The steam then flows axially to the four exhaust ports of the high pressure turbine, and then to the low pressure turbines. The throttle and governing valves of the high pressure turbine are actuated by an electro-hydraulic control system which continuously monitors and compares turbine speed and first-stage pressure with desired values determined by an operator.

All piping is expansion jointed to allow for thermal expansion and possible bending and shock loads imposed in accident situations.

The three low pressure turbines are also dual-flow types, incorporating various features to maximize efficiency and minimize thermal gradiant distortion of the casing and blades. The temperature drop from inlet to exhaust is taken across three walls, thus limiting thermal distortion by reducing the temperature gradiant experienced by any one wall. Reaction stages are used throughout, and the last stage blades are 44 inches long. Steam leaving the last stage goes through a diffuser to convert the velocity energy to pressure energy.

In a typical land based power plant, over-speed of the low power turbines creates a definite hazzard due to the limitation of these turbines to 186% of normal operating rpm before failure, resulting in a missile hazzard from the blades. However, in the present invention, the structural design of the entire plant is such that the danger of turbine missile damage is minimal. The containment walls of each sphere are 6.5 feet thick, and the reactor vessel, control area, emergency core cooling system pumps, and fuel storage and radioactive waste pits are all in other spheres or in the platform legs. Thus, damage to vital components of the nuclear power plant due to missile hazzards is unlikely.

The steam driven turbines are connected through a transmission to electrical generators. The transmission includes a clutch/brake system for each turbine which would disengage the turbine, open steam by-pass valves, and brake the turbine rotor to a stop in the event of a mojor turbine or control failure. The electrical generator also has a clutch/brake system. Should the generator clutch disengage, dropping the mechanical load on the transmission, all of the turbine brakes would engage sufficiently to prevent over speeding.

The transmission itself will consist of a driving spur gear, pinnions and idler gears. The arrangement of the components in the transmission unit is such that bearing forces are as evenly and symetrically distributed as possible on the spur gear shaft. The spur gear is designed to be as massive as is possible. An increase in the rotational enertia of the spur gear is desirable for two reasons: first if the reactor is scrammed, there is a need for electrical power to provide for a safe shut-down. At least a part of this power could be supplied by the plant's own generator if the spur gear were massive enough to continue to coast, thus turning the generator; and second, the spur gear, acting as a gyroscope, would increase to platform stability.

The electrical generator to which the turbines are connected by means of the transmission is rated at 1,220 mva with an output of 22,000 to 25,000 volts of three phase, 60 hertz current. It is hydrogen cooled, the gas being sealed in the generator by pressurized oil gland seals. Special design consideration must be given to the generator casing, which must be water tight under conditions of a main steam line rupture or from a direct stream of sea water from a leak in the surrounding pressure sphere.

The exciter of the generator is driven by the generator through a one-to-one 90-degree angle gear box. It is a rotating rectifier exciter which, through the elimination of the commutator brushes and collector ring, reduces maintenance and low insulation resistance to ground caused by carbon dust. Furthermore, this design eliminates the generator field breaker, exciter field rheostat, and main lead bus wiring between the exciter and the alternating current generator.

Because it is presently impracticable to super-heat steam in a nuclear reactor, six reheater/demoisturizers are provided to improve power production efficiency. Since cooling water temperatures are typically lower in the ocean depths than on the surface, the efficiency of the reheaters is improved, thereby allowing the plant to operate acceptably on five of the reheaters if maintenance on one need be performed.

Steam from the high pressure turbine exhaust first enters the chevron-type separators of the demoisturizer section of the reheater where expansion-produced water is removed. The steam them passes through a two-stage super heater that derives its heat from main steam extraction points located before the entrance to the throttle and governing valve controls on the high pressure turbine. Over 100-degrees F. of super heat is added to the steam supply by the reheaters. Moisture that is removed drains to the feed water heaters as does the condensed main steam used for super heating. Both the low power turbines and the main feed water pump turbines are driven by the steam emerging from the reheaters.

The condensers for the power generation plant in the generating sphere 180 run the length of the two platform legs upon which the generating sphere 180 rests. Pressure hatches in each of the two legs allow access to the condenser tubes in order to replace to maintain the tubes. The efficiency of the condensers is very good due to the lower temperature of water even a few hundred feet beneath the surface of the ocean.

During plant operation, the condensers must be capable of a heat removal rate of a minimum of $7.9 \times 10^{9*}$ B.T.U./hour. In addition, the condensers must deaerate the initial volume of feed water in the condensate dash feed water system. The two main condensers used in the present invention are triple shell, single pass units, with an operating pressure of 1.94 inches of mercury maintained by the decrease in volume of the steam as it condenses and by six dash stage air ejectors.

The condenser unit is designed to accept up to 70% of the steam generator production capacity before scramming of the reactor occurs. Exhaust hood temperatures and circulation water temperatures up to 175-degrees F. and 85-degrees F., respectively, can be accomodated without scramming the reactor.

As part of the condensate-feed water system, two condensate booster pumps are included per unit. Each condensate booster pump has a capacity of approximately 10,000 gallons/per minute and are driven by 2,000 h.p. electric motors.

Two main feed water pumps with normal capacities of 20,000 gallons/per minute with a 19,000 foot head are incorporated in the design of the turbine-generator system. Each is driven by a main feed water pump turbine which operates off a steam extraction point between the reheater outlets and the low power turbine inlets.

The remaining pressure sphere on the platform is a support sphere 190 shown in FIG. 3. The support sphere 190 houses control equipment and the operating station for the power plant, personnel living facilities, life support equipment, emergency storage batteries, power transformers, and parts storage and repair shops.

Electrical power produced in the generating sphere 180 is routed to the main step-up transformers located in the support sphere 190. After transformation to a higher voltage, the power is routed through bundled submarine transmission cables to a shore power switching yard. The power plant itself will operate off of its own electrical power during normal operation periods by means of appropriate step-down tranformers located in the support sphere 190. Emergency electrical power for the entire nuclear power generating plant will come from power lines from shore to the platform, connected to emergency diesel-electric generators located in the shore switching facility, or alternatively from storage batteries located in the support sphere 190.

Cables (not shown) used to transport electrical power to shore are fully insulated and water tight. They are perferably buried to protect them from damage by anchors, fish nets, and other dragging objects that could foul the lines.

The voltage level for the transmission system is approximately 345 kv and includes two complete circuits to shore, one for normal use and one for backup. Switching equipment is provided in the support sphere 190 to energize the spare circuit automatically in the event of a primary cable failure so that the rated power plant output may be maintained.

Particularly important to the unique nature of an underwater nuclear power plant is the life support system. Of primary importance is the oxygen generation system. The primary method of oxygen generation in the present invention would be by electrolytic dissociation of sea water, made possible by the abundant supply of electrical power generated by the plant itself. The main advantage of this method of production is its continuous availability, independent of mission duration.

A second method of oxygen generation is by means of an umbilical hose to an oxygen generator and pumps in a shore support facility. Should the primary oxygen generators in the nuclear power plant structure fail completely, this back up system would automatically engage and provide a fresh atmosphere to the plant.

As a last resort, a third system, consisting of high pressure stored oxygen would be used to maintain a breathable atmosphere in the personnel section of the support sphere. This last system is capable of being operated both automatically and manually.

Also important to the life support system would be the carbon dioxide elimination system, handled by amine scrubbers. In such scrubbers a water solution of mono-ethanolamine combines with free carbon dioxide in the atmosphere. The solution is then heated while passing through an air stream, causing carbon dioxide to be released, where it can be collected and pumped overboard. The amine solution is then reused.

A major problems in the closed environment of the present invention beyond oxygen generation and carbon dioxide removal is the control of trace contaminants such as toxic, flammable, corrosive, or biological agents. The source of these contaminants is incomplete combustion; leakage of chemicals employed as refrigerants, lubricants, electrolytes, gage fluids, and process fluids, etc.; the generation of aerosols by machinery; use of solvents in cleaning, painting and personnel hygiene; bacteria associated with waste disposal; and the products of tobacco smoking. These contaminants are removed by a number of techniques. The liberal use of electrostatic precipitators will greatly reduce the particle and aerosol content of the atmosphere. Gases and vapors which are potentially toxic because of oxygen deficiency, such as carbon monoxide, are eliminated through the use of catalytic burners consisting of beds of special material maintained at high temperature through which the atmosphere is regularly passed, thus causing many toxic and flammable elements to be burned to a higher oxidation level or absorbed. Units of the contaminant removal system will be strategically located as closely as possible to the sources of contamination they are designed to control, thus improving their efficiency and decreasing the total number of units necessary.

Also included in the life support system are special gas analyzers to continously sample the atmosphere of all three pressure vessels and the compartments in the platform legs for proper oxygen, carbon dioxide, and carbon monoxide levels as well as for explosive agents in the atmosphere. These measured levels will be compared against recommended values and minimum acceptable values both by a computer and by an operator. Should one or more of the gases drop below the minimum acceptable level, emergency actions will be taken to restore the atmosphere to its proper composition in that area.

Biological contamination of the support sphere is minimized by careful design of sanitary spaces and vents such that contaminated atmosphere does not enter the general atmosphere of the power plant. Sterilization lamps in such spaces and other sanitary precautions are to be included in the power plant design.

The internal environments of the three vessel spheres and in the compartments of the platform structure will be controlled within acceptable limits for safety, comfort, and equipment protection by several heating, cooling, humidity, and blower systems. Heating systems will involve both electric and condenser effuent hot water systems while cooling will utilize fan coil units supplied with direct expansion, chilled water, or sea water coils.

Communication to an from the support sphere 190 to the shore would be via underwater cable. Secondary and emergency communication systems would include high frequency communication bouys and underwater telephones.

Also located in the support sphere 190 are the master controls for a fire protection system, stability control system, and compressed air system. Fire detection would be accomplished by means heat and smoke sensors in conjunction with television cameras. An automatic system of water and carbon dioxide fire control outlets are governed from the support sphere. Manually operated water and carbon dioxide stations located throughout the three spheres of the nuclear power generating plant provide backups for the automatic system. Portable oxygen supplies for crew members would also be located throughout the plant.

The stability control system automatically maintains the entire platform in a horizontal plane by adjusting ballast through a system of cross-connected valves, pumps, and storage tanks throughout the platform. Because excess water might be discharged into the ocean, radiation and acid contamination sensors are placed in all over-board discharge ports. If these sensors are activated, the discharge valves are automatically shut down. In an emergency, however, an operator can override the stability control system, including the contaminated discharge shutdown circuit, in order to maintain the balance of the platform. In the event such action is taken, however, a computer system would record the volume and condition of any fluids discharged from the plant.

A compressed air system provides a plant-wide supply of compressed air for general plant service needs, instrumentation needs, testing, and control uses. The stability control system, in particular, requires large supplies of compressed air. The compressed air system provides, at a minimum, sufficient air for an orderly plant shut-down under all conditions.

Because access to and from an underwater nuclear power generating plant is necessarily by submersible service vessel or diving bell, a sea bed navigation system would be provided for underwater navigation to and from the plant. The system would consist of a series of hydrophones implanted in the sea floor and located at regular intervals from the shore support facility to the underwater nuclear power generating plant. Such devices would allow submersible service vessels to keep accurate track of their position during transit to and from the plant.

The foregoing has described a particular implementation of the novel concepts of this invention. It will be apparent that other equivalent implementations and variations may be effected without departing from the scope of this invention. For example, various steam generators, reactor core configurations and other known items may be used in the reactor structures of the present invention.

We claim:

1. A structure for an underwater nuclear power generating plant comprising:
   three spherical pressure vessels for housing various components of a nuclear power generating plant; and
   a submersible platform having a triangular configuration for supporting said pressure vessels and connected thereto, said platform formed from three interconnected tubular leg members, three tubular trusses, each truss having two ends, a central post member, one end of each of said trusses being connected to one associated leg member with the other end of each truss being connected to said central post member; and
   each said pressure vessel being adjacent to and supported by two leg members, the interior of each said pressure vessel being in communication with the interior of each adjacent tubular leg member such that material can be readily transferred to and from the interior of an associated pressure vessel to the interior of an associated leg member.

2. The structure according to claim 1 wherein a nuclear reactor is disposed in one of said spherical vessels.

3. The structure according to claim 1 wherein said three spherical vessels are joined together by conduit members.

4. The structure according to claim 1 wherein said central post member is axially located in said platform and depends downwardly therefrom.

5. The structure according to claim 1 wherein said central post member includes a support ring, each said sphere being joined to said support ring.

6. The structure according to claim 1 wherein each said sphere has two concentric shells.

7. The structure according to claim 1 wherein each said sphere includes means for connecting said sphere to an external vessel.

8. The structure according to claim 1 wherein a plurality of additional pressure tanks are joined to said platform.

9. A structure for an underwater nuclear power generating plant comprising:
 a first spherical pressure vessel housing a nuclear reactor, steam system and reactor containment system;
 a second spherical pressure vessel connected to said first pressure vessel for housing a steam turbine-generator system, said steam turbine-generator system coupled to and driven by said nuclear reactor and steam system in said first vessel;
 a third spherical pressure vessel connected to said first pressure vessel and to said second pressure vessel for housing a control and operating system, a life support system, and electrical transformers; and
 a submersible platform having a triangular configuration supporting said first, second, and third pressure vessels, said platform formed from three interconnected tubular leg members, three tubular trusses, each truss having two ends, a central post member, one end of each of said trusses connected to one leg member and the other end of each truss connected to said central post member, and
 each of said pressure vessels being adjacent to and supported by two leg members such that the interior of each said pressure vessel is in communication with the interior of each adjacent tubular leg member whereby material can be readily transferred to and from the interior of an associated pressure vessel to the interior of an associated leg member.

10. The structure according to claim 9 wherein said central post member is axially located in said platform and depends downwardly therefrom.

11. The structure according to claim 9 wherein a plurality of additional pressure tanks are joined to said platform.

12. The structure according to claim 9 including mooring means for holding said structure in a desired position underneath a body of water.

* * * * *